March 10, 1964 H. G. JUNGK 3,124,709
COMMUTATOR CONNECTION CONSTRUCTION
Filed June 6, 1962 2 Sheets-Sheet 1
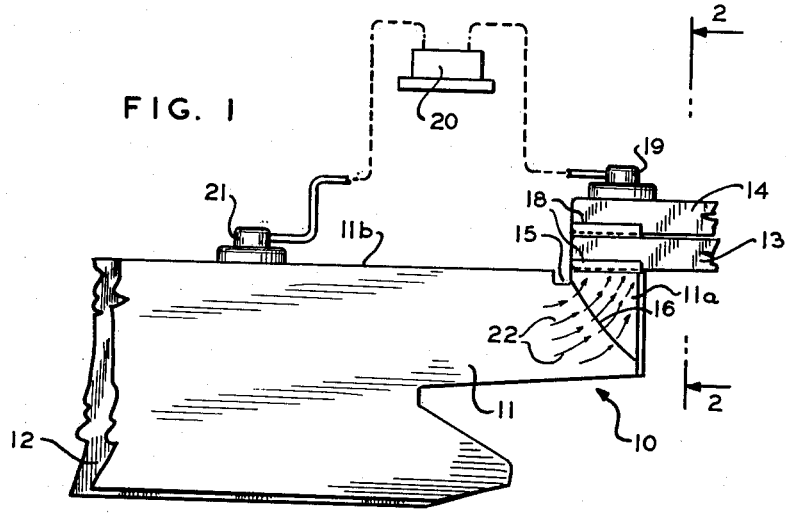
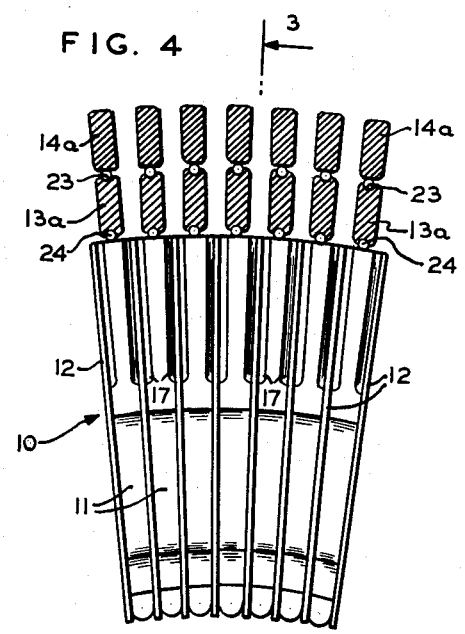
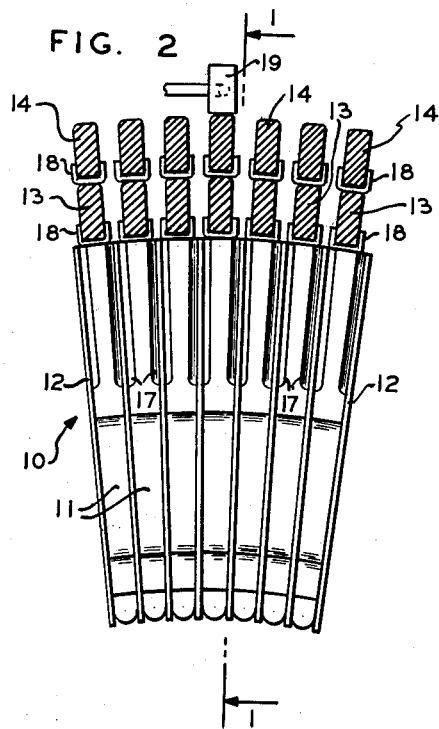
INVENTOR.
HERBERT G. JUNGK
BY
George H. Fritzinger
AGENT March 10, 1964  H. G. JUNGK  3,124,709
COMMUTATOR CONNECTION CONSTRUCTION
Filed June 6, 1962  2 Sheets-Sheet 2

INVENTOR.
HERBERT G. JUNGK
BY
George H. Fritzinger
AGENT

United States Patent Office 3,124,709
Patented Mar. 10, 1964

3,124,709
COMMUTATOR CONNECTION CONSTRUCTION
Herbert G. Jungk, Columbus, Ohio, assignor to McGraw-Edison Company, Elgin, Ill., a corporation of Delaware
Filed June 6, 1962, Ser. No. 200,437
2 Claims. (Cl. 310—234)

This invention relates to a novel method of joining armature coil leads of electric motors and the like to commutator bars and to the improved commutator construction resulting from this method.

It has been a practice to provide slotted risers on the bars at the inner end of the commutator and to drive the ends of the armature coil leads down into the slots of these risers and then secure the same by soldering with soft solder such as of tin or lead-tin alloy.

In order that the armature winding may now operate at higher temperatures there is need to braze or silver solder the two coil leads to each commutator bar. Furthermore, it is desirable to eliminate the risers on the commutator bars and to braze the coil leads to inner end extensions of the commutator bars at the same level as the brush surfaces to save copper. However, when this is done there is a tendency for the high heat of the brazing operation to char or otherwise damage the mica insulation between the commutator bars where the weld joints are made.

By the present invention the risers are eliminated and the difficulties which have been encountered in brazing the coil leads directly to the respective commutator bars have been alleviated by a novel method which enables the two coil leads for each commutator bar to be joined thereto at the same time. In this novel method air cooling of the commutator bars at the place of the welds is provided to avoid damaging the adjacent insulation by straddle milling the end portions of the commutator bars where the joints are made so that there is air space between these end portions of the commutator bars and the adjacent insulation.

The simultaneous brazing of both coil leads to a commutator bar is done in accordance with the present invention by placing one lead on the inner extension of the commutator bar with a strip of hard solder interposed therebetween and by placing the second lead on top of the first lead also with a strip of hard solder interposed therebetween. Thereupon, while pressing a terminal contactor of a brazing source of current against the upper lead to hold the two leads firmly in place with pressure against the inner end extension of the commutator bar, and while pressing the other terminal contactor of the brazing source against the brush surface of the respective commutator bar, a heavy flow of current is passed through the bar and crosswise through the leads to heat the latter to a welding temperature. In this welding operation the hard solder strips reach a molten temperature to join integrally the first lead wire to the commutator bar and in turn the second lead wire to the first lead wire producing in effect a constructiotn as though the lead wires had been joined to a riser. By so producing the two welds in one operation the extent of heating the commutator bar and adjacent insulation is reduced because the heating time is cut in half and also because one of the two welds is made away from the commutator bar by the thickness of the one coil lead.

An object of the invention is to provide a stronger and more economical commutator and coil lead construction for electric motors and the like, which is capable of operating at higher temperatures and higher speeds.

Another object is to provide a novel method of joining coil leads to the bars of a commutator without the use of risers on the bars and without damaging the insulation between the bars where the welds are made because of the heat of the welding operation.

Other objects and features of the invention will be apparent from the following description and the appended claims.

In the description of the invention reference is had to the accompanying drawings of which:

FIGURE 1 is a fractional view of the commutator bar and coil lead assembly ready for a welding operation as it appears from line 1—1 of FIGURE 2;

FIGURE 2 is a cross sectional view taken on the line 2—2 of FIGURE 1;

FIGURE 4 is a cross sectional view taken on the line 4—4 of FIGURE 3; and

Figure 3:
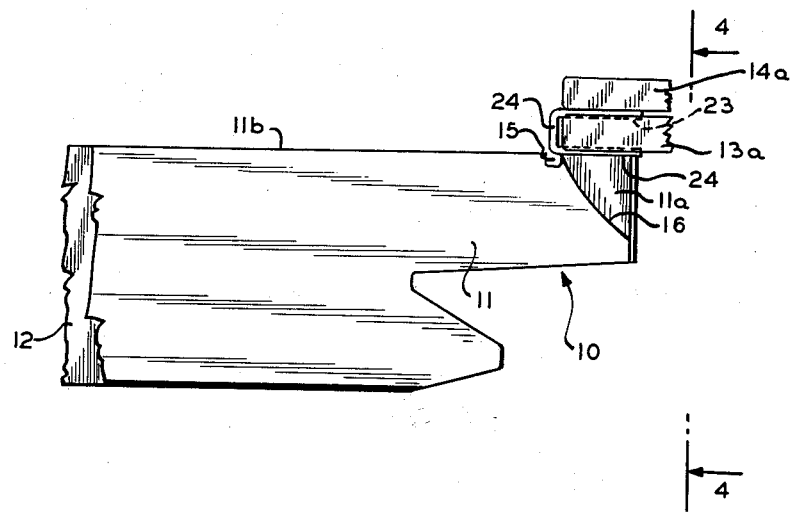
FIGURE 3 is a view similar to FIGURE 1 taken on the line 3—3 of FIGURE 4 illustrating a modification in the form of the hard solder strips used between the coil leads and the commutator bar prior to welding.

As illustrated by the fractional views of FIGURES 1 and 2 a commutator 10 of an electric motor or the like comprises a series of commutator bars 11 joined in a cylindrical arrangement about the shaft of the motor as an axis with the strips of insulation 12 typically of mica interposed between the successive bars. The bars and insulation are held on the shaft in an integral construction not herein necessary to describe.

As is well known, a pair of armature coil leads 13 and 14 typically of rectangular cross section are joined to each commutator bar and a brush as of carbon (not shown) rides on the peripheral surface of the commutator to make the necessary temporary current connections to the armature winding as the armature is rotated. The present invention resides in the method by which pairs of the coil leads are joined to the respective bars of the commutator and to the improved construction of the commutator which results from this method. A feature of the invention resides in eliminating the usual risers extending upwardly from the inner ends of the commutator bars. Instead, each commutator bar is provided with an inner end extension 11a at the level of the brush surface 11b of the bar. For reasons which will be apparent the extension 11a is set off from the brush surface 11b by a peripheral groove 15 cut into the commutator. To permit some air cooling of the inner end extension 11a as the lead wires 13 and 14 are welded thereto the inner end extensions are straddle milled to an oblique line 16 running diagonally from the groove 15. This straddle milling of the inner end extensions of the bars provides air spaces 17 between the commutator bars and the adjacent insulation strips 12 where the weld joints are to be made.

Figure 5:
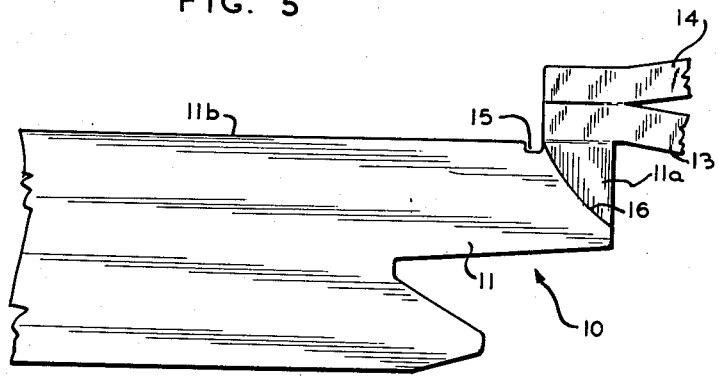
FIGURE 5 is a view similar to FIGURE 1 showing the integral construction of commutator bar and coil lead assembly after the same are welded together in accordance with the invention.

In carrying out the welding operation a strip 18 of hard solder preferably of a channel bar shape is pressed onto the lower side of each rectangular lead wire 13 and 14 with the side flanges of the strips extending upwardly and embracing the side walls of the lead wires as shown clearly in FIGURE 2. The lead wire 13 is then seated on the inner end extension 11a of the respective commutator bar with a hard solder strip 18 interposed between it and the bar, and the lead wire 14 is in turn seated on top of the lead wire 13 with another hard solder strip 18 likewise interposed therebetween. Thereupon one terminal contactor 19 of a welding source of current such as a generator 20 is pressed downwardly onto the top lead wire 14 to hold the two lead wires firmly in place with pressure against the inner end extension 11a of the respective commutator bar. At the same time the second terminal contactor 21 of the generator 20 is pressed firmly onto the brush surface 11b of the respective commutator bar. The circuit is then closed momentarily to cause a heavy flow of current through the commutator bar and crosswise through the lead wires 13 and 14 as indicated by the arrows 22. Since the joints between the lead wires and the commutator bar are the points of greatest resistance the heating of the electric current is concentrated at these points to heat the hard solder strips 18 to a molten temperature and to join integrally therefore the lower lead wire 13 to the commutator bar and the upper lead 14 in turn to the lower lead 13. Since the lead wires are of a rectangular cross section provided with rounded edges the molten solder from the side flanges of the channel bar strips 18 runs down along the sides of the copper leads and fills the horizontal cracks at the joints to form a fillet weld. During the welding operation the peripheral slot 15 is effective in preventing the welding current from concentrating at the end of the inner lead 13 and in producing thus a more even weld along the length of the inner commutator extension 11a. After the lead wires are brazed to the commutator the bare joints may be coated with epoxy resin or other insulating finishes to provide a finished integral construction of lead wires and commutator bars as illustrated in FIGURE 5.

In the alternative embodiment shown in FIGURES 3 and 4 the portion of the lead wire 13a between the lead wire 14 and the respective commutator bar is provided with lengthwise grooves 23 in its top and bottom sides and a U-shaped strip 24 of hard solder circular in cross section is pressed onto the wire 13a from the end thereof into engagement with these grooves as shown. The welding operation is then carried out in the manner hereinbefore described.

The embodiments of my invention herein particularly shown and described are intended to be illustrative and not limitative of my invention since the same are subject to changes and modifications without departure from the scope of my invention, which I endeavor to express according to the following claims.

I claim:
1. In combination, a bar of a commutator having an arm at one end extending in line with the brush surface thereof, said arm being recessed at the sides to provide air spaces between the side walls of the arm and the adjacent insulation strips of the commutator, and a pair of armature coil leads of rectangular cross section superimposed on each other and seated onto said arm, said coil leads being welded together and the coil lead adjacent to said arm being in turn welded to the latter.

2. In combination, a commutator comprising a group of commutator bars and mica insulation strips between successive bars secured in a cylindrical arrangement, said bars having outer brush surfaces terminating on a cylinder about the axis of the commutator, said bars having peripheral arms at one end of the commutator extending parallel to the axis of the commutator, said commutator having a peripheral groove separating said arms from the brush surfaces of the commutator bars, and said arms having recessed sides leading from said peripheral groove to provide air spaces between the sidewalls of the arms and the adjacent insulation strips of the commutator, and a pair of armature coil leads for each commutator bar having aligned end portions of which one is superimposed on the other and the other is seated on the outer surface of the arm of respective commutator bar in directions lengthwise thereof, each of said pair of armature coil leads and the respective arm being brazed together across their contiguous surfaces to secure each pair of leads in mechanical and electrical bonded relation to the respective commutator bar.

References Cited in the file of this patent
UNITED STATES PATENTS 2,400,902    Allen _____ May 28, 1946
2,782,330    Baclowski _____ Feb. 19, 1957

OTHER REFERENCES

Arnold, E.: Die Gleichstrummaschine, vol. 1; Julius Springer, Berlin, 1906, page 68, FIG. 77.